US008447339B2

(12) United States Patent  
Wu et al.

(10) Patent No.: US 8,447,339 B2  
(45) Date of Patent: May 21, 2013

(54) LONG-TERM-CSI-AIDED MU-MIMO SCHEDULING METHOD, BASE STATION AND USER EQUIPMENT

(75) Inventors: Keying Wu, Shanghai (CN); Lei Wang, Shanghai (CN)

(73) Assignee: Alcatel Lucent, Paris (FR)

( * ) Notice: Subject to any disclaimer, the term of this patent is extended or adjusted under 35 U.S.C. 154(b) by 247 days.

(21) Appl. No.: 12/864,334

(22) PCT Filed: Jan. 30, 2008

(86) PCT No.: PCT/CN2008/000238  
§ 371 (c)(1),  
(2), (4) Date: Jul. 23, 2010

(87) PCT Pub. No.: WO2009/100567  
PCT Pub. Date: Aug. 20, 2009

(65) Prior Publication Data  
US 2010/0304776 A1   Dec. 2, 2010

(51) Int. Cl.  
*H04B 7/00* (2006.01)

(52) U.S. Cl.  
USPC ........... 455/509; 455/450; 455/464; 455/463; 370/310; 714/752

(58) Field of Classification Search ............... 455/501, 455/509, 561, 272, 450, 69, 522, 101, 424, 455/454, 456.2, 464, 9, 512, 507, 552.1, 455/67.11, 67.13, 67.16, 515, 463; 370/203, 370/208, 329, 252, 241, 315, 310; 375/220, 375/224, 267, 295, 316, 259, 260; 709/216; 714/752, 714/E11.032

See application file for complete search history.

(56) References Cited

U.S. PATENT DOCUMENTS

| | | | |
|---|---|---|---|
| 2005/0032521 A1* | 2/2005 | Lee et al. | 455/450 |
| 2007/0223423 A1 | 9/2007 | Kim et al. | |
| 2007/0280116 A1* | 12/2007 | Wang et al. | 370/236 |
| 2008/0070564 A1* | 3/2008 | Li et al. | 455/424 |
| 2008/0165720 A1* | 7/2008 | Hu et al. | 370/315 |
| 2008/0260051 A1* | 10/2008 | Boccardi et al. | 375/259 |
| 2009/0175375 A1* | 7/2009 | Zhang | 375/267 |
| 2010/0306613 A1* | 12/2010 | Wu et al. | 714/752 |
| 2011/0243045 A1* | 10/2011 | Dao et al. | 370/310 |

FOREIGN PATENT DOCUMENTS

| | | |
|---|---|---|
| CN | 1592144 A | 3/2005 |
| CN | 1780173 A | 5/2006 |
| CN | 1917497 A | 2/2007 |
| CN | 1941660 A | 4/2007 |
| CN | 101034923 A | 9/2007 |
| WO | 2007102546 A1 | 9/2007 |

OTHER PUBLICATIONS

International Search Report for PCT/CN2008/000238.

(Continued)

*Primary Examiner* — Tan Trinh  
(74) *Attorney, Agent, or Firm* — Fay Sharpe LLP

(57) ABSTRACT

The present invention proposes a multiuser multi-input multi-output scheduling method, which comprises steps of: a multiuser scheduling step of performing multiuser scheduling by using mean channel matrixes of respective user equipments; and a multiuser precoding step of performing multiuser precoding by using instantaneous channel matrixes of respective user equipments selected in the multiuser scheduling. The present invention also proposes a base station and a user equipment which will be used to implement the inventive multiuser multi-input multi-output scheduling method.

13 Claims, 4 Drawing Sheets

OTHER PUBLICATIONS

European Patent Application No. 08700757.1, Extended European Search Report, Sep. 20, 2012, 7 pp.

IEEE C802.16m-08/059, Zhou et al., IEEE 802.16 Broadband Wireless Access Working Group, Proposal for general MIMO transmission structure for 16m system, Jan. 16, 2008, 4 pp.

R1-051407, Huawei, TSG-RAN WG1 #43, Seoul, South Korea, Nov. 7-11, 2005, Downlink MIMO for E-UTRA, 6 pp.

R1-073208, Ericsson, 3GPP TSG-RAN WG1 #49bis, Orlando, USA, Jun. 25-29, 2007, SDMA for MU-MIMO Support in E-UTRA DL with Correlated Antenna Setup, 3 pp.

English Bibliography for Chinese Patent Application Publication No. CN101034923, filed Mar. 7, 2006, printed from Thomson Innovation on Nov. 29, 2012, 2 pp.

English Bibliography for Chinese Patent Application Publication No. CN1941660, filed Sep. 30, 2005, printed from Thomson Innovation on Nov. 29, 2012, 2 pp.

English Bibliography for PCT Patent Application Publication No. WO2007102546, filed Mar. 7, 2007, printed from Thomson Innovation on Nov. 29, 2012, 4 pp.

* cited by examiner

LONG-TERM-CSI-AIDED MU-MIMO SCHEDULING METHOD, BASE STATION AND USER EQUIPMENT

BACKGROUND OF THE INVENTION

1. Field of Invention

The present invention relates to the domain of wireless communications, more particularly, to a long-term-Channel State Information (CSI)-aided MultiUser Multi-Input Multi-Output (MU-MIMO) scheduling method, a base station and a user equipment, and aims to reduce the feedback overhead for joint MU-MIMO and multiuser scheduling.

2. Description of Prior Art

MU-MIMO has been shown to provide a great capacity advantage over single-user MIMO (SU-MIMO) in theory. It points out a promising way to solve the throughput bottleneck in wireless communication systems. The potential capacity benefit of MU-MIMO can be increased by orders through a joint operation with multiuser scheduling to exploit the multiuser diversity gain as well as the spatial diversity gain. In such a joint operation, the base station (BS) needs to know the full channel state information (CSI) for all users in the cell, not only for active users selected for service. This will lead to a heavy feedback overhead in frequency division duplex (FDD). When the total user number is large, the feedback overhead becomes prohibitive, which greatly restricts the application of MU-MIMO in practical systems. The aim of invention is to provide a long-term-CSI-aided MU-MIMO scheduling strategy to solve this problem.

Most existing solutions to the above problem adopt the concept of codebook to reduce the feedback overhead. The basic idea is to use a pre-determined codebook containing a set of vectors with unit norm, which is known to both the BS and all terminals, and to provide the BS with a vector index, as well as a real-valued channel quality indicator (CQI), from each terminal. The codebook technique effectively restricts the feedback overhead for each single user, but the overall feedback overhead still grows linearly with the total user number K in a cell, which can be very large when K is large.

SUMMARY OF THE INVENTION

The basic principle of this solution is to use long-term CSI of all users to reduce the feedback overhead required for a joint MU-MIMO and scheduling scheme.

A joint MU-MIMO and scheduling operation can be divided into the scheduling phase and multiuser precoding phase. In the scheduling phase, a set of active users is selected out of all users according to sum-capacity maximization or other criterion, which will be served over the same time and frequency resource. In the multiuser precoding phase, the BS generates precoding vectors for active users and then performs multiuser precoding. It is only in the scheduling phase that CSI is required for all users. In the multiuser precoding phase, on the other hand, only CSI for active users will be needed. Since the total user number is always much larger than active user number, the scheduling phase is usually responsible for unacceptable feedback overhead.

Motivated by the above discussion, we propose to use long-term statistical CSI, in particular the mean channel matrixes, instead of instantaneous CSI, in the scheduling phase. Since the long-term statistical CSI changes much slower, it can be updated in a much lower speed, which can effectively reduce the overhead of the scheduling phase. In the multiuser precoding phase, instantaneous CSI is still used since the performance of multiuser precoding is sensitive to the inaccuracy of CSI. Keeping in mind that the scheduling phase generally dominates the feedback overhead, the proposed idea is effective in feedback reduction.

According to a first aspect of the present invention, there is provided a joint MultiUser Multi-Input Multi-Output (MU-MIMO) precoding and scheduling method, which comprises steps of: a multiuser scheduling step of performing multiuser scheduling by using mean channel matrixes of respective user equipments; and a multiuser precoding step of performing multiuser precoding by using instantaneous channel matrixes of respective user equipments selected in the multiuser scheduling.

Preferably, the multiuser scheduling step includes sub-steps of: informing all user equipments to feed back their mean channel matrixes; receiving the mean channel matrixes calculated and fed back by all the user equipments; and performing the multiuser scheduling by using the fed back mean channel matrixes so as to generate an optimized scheduling result.

More preferably, the optimized scheduling result indicates at least the number of selected/active user equipments, the indexes of the selected/active user equipments, and the numbers of the selected/active user equipments' data streams.

More preferably, the optimized scheduling result is generated so as to maximize the throughput of a wireless communication system. Moreover, the optimized scheduling result is generated so as to maximize the capacity of the wireless communication system.

Preferably, the multiuser precoding step includes sub-steps of: informing all selected/active user equipments to feed back their instantaneous channel matrixes; receiving the instantaneous channel matrixes fed back by all the selected/active user equipments; calculating precoding matrixes for the respective selected/active user equipments based on their instantaneous channel matrixes; multiplying data vectors of the respective selected/active user equipments with their respective precoding matrixes to generated the respective precoded messages for each selected/active user equipments; and sending the respective precoded messages to each selected/active user equipments.

Preferably, the instantaneous channel matrixes are measured every first time interval $T_I$, and the mean channel matrixes are calculated every second time interval $T_L$ by using the measured instantaneous channel matrixes during the immediate second time interval $T_L$, the first time interval $T_I$ is smaller than the second time interval $T_L$. More preferably, the second time interval $T_L$ is an integral multiple of the first time intervals $T_I$.

According to a second aspect of the present invention, there is provided a base station, which comprises: a sending unit for sending a message to inform user equipments to feed back their mean channel matrixes and/or instantaneous channel matrixes; a receiving unit for receiving the mean channel matrixes and the instantaneous channel matrixes fed back from user equipments; a multiuser scheduling unit for performing multiuser scheduling by using the mean channel matrixes of the respective user equipments; and a multiuser precoding unit for performing multiuser precoding by using the instantaneous channel matrixes of respective user equipments selected by the multiuser scheduling unit.

Preferably, the multiuser scheduling unit informs all user equipments to feed back their mean channel matrixes by means of the sending unit, receives the mean channel matrixes calculated and fed back by all the user equipments by means of the receiving unit, and performs the multiuser scheduling by using the fed back mean channel matrixes so as to generate an optimized scheduling result.

More preferably, the optimized scheduling result indicates at least the number of selected/active user equipments, the indexes of the selected/active user equipments, and the numbers of the selected/active user equipments' data streams.

More preferably, the multiuser scheduling unit generates the optimized scheduling result so as to maximize the throughput of the wireless communication system in which the base station is located. Moreover, the multiuser scheduling unit generates the optimized scheduling result so as to maximize the capacity of the wireless communication system.

Preferably, the sending unit is also used for sending precoded data to the user equipments, and the multiuser precoding unit informs all active user equipments selected by the multiuser scheduling unit to feed back their instantaneous channel matrixes by means of the sending unit, receives the instantaneous channel matrixes fed back by all the active user equipments by means of the receiving unit, calculates precoding matrixes for the respective active user equipments based on their instantaneous channel matrixes, multiplies data vectors of the respective active user equipments with their respective precoding matrixes to generated the respective precoded messages for each active user equipments; and sends the respective precoded messages to each active user equipments by means of the sending unit.

Preferably, the multiuser precoding unit calculates the multiuser precoding matrixes for active user equipments every first time interval $T_I$, and the multiuser scheduling unit performs the multiuser scheduling every second time interval $T_L$, wherein the first time interval $T_I$ is smaller than the second time interval $T_L$. More preferably, the second time interval $T_L$ is an integral multiple of the first time intervals $T_I$.

According to a third aspect of the present invention, there is provided a user equipment, which comprises: a receiving unit for receiving a message requesting to feed back instantaneous channel matrix and/or mean channel matrix from a base station; an instantaneous channel matrix measuring unit for measuring its instantaneous channel matrix every first time interval $T_I$; a mean channel matrix calculating unit for calculating its mean channel matrix every second time interval $T_L$ by using the instantaneous channel matrixes measured by the instantaneous channel matrix measuring unit during the immediate second time interval $T_L$; and a sending unit for sending the measured instantaneous channel matrix and/or the calculated mean channel matrix to the base station, wherein the first time interval $T_I$ is smaller than the second time interval $T_L$.

Preferably, the second time interval $T_L$ is an integral multiple of the first time intervals $T_I$.

This invention has the following benefits:
1. It leads to a considerable reduction in the feedback overhead of a joint MU-MIMO and multiuser scheduling system.
2. It greatly simplifies the scheduling complexity, since the scheduling operation is performed only when the statistical CSI is updated.
3. It simplifies the terminal operation related to channel estimation and CSI feedback.

It does not bring any additional complexity at the BS.

BRIEF DESCRIPTION OF THE DRAWINGS

The above and other objects, features and advantages of the present invention will be clearer from the following detailed description about the non-limited embodiments of the present invention taken in conjunction with the accompanied drawings, in which.

DETAILED DESCRIPTION OF PREFERRED EMBODIMENTS

Figure 1:
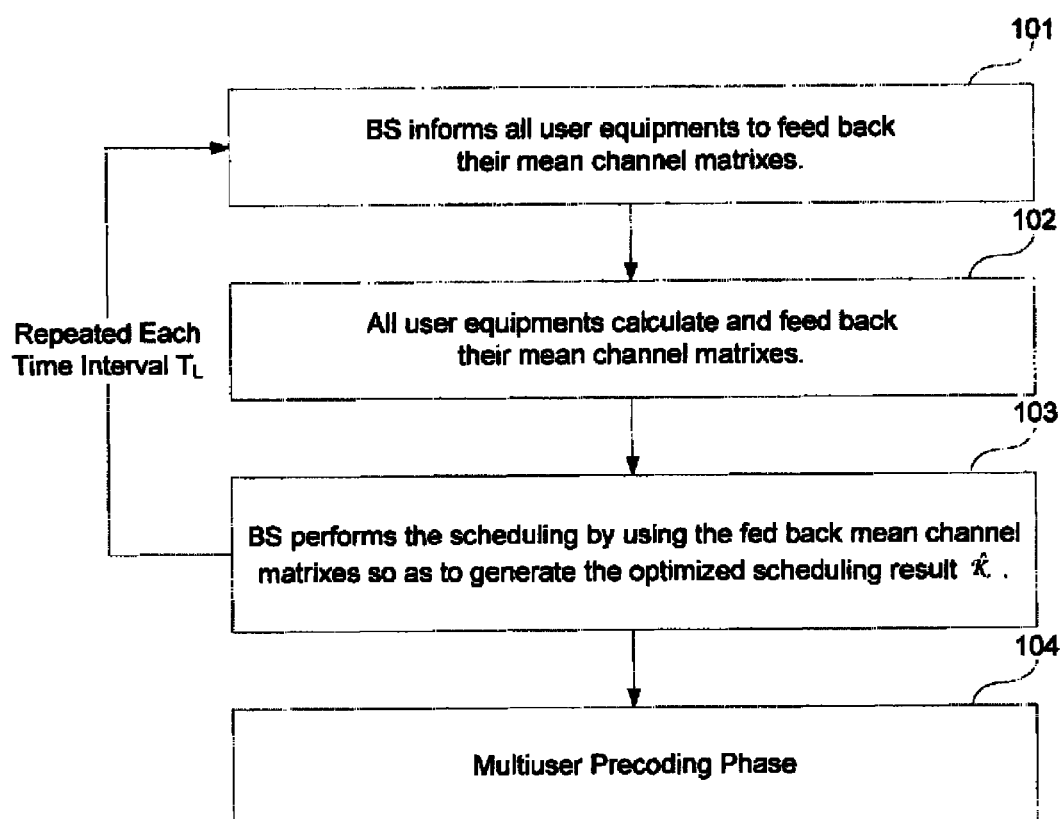
FIG. 1 shows the flowchart of the scheduling phase according to the present invention.

Hereunder, the present invention will be described in accordance with the drawings. In the following description, some particular embodiments are used for the purpose of description only, which shall not be understood as any limitation to the present invention but the examples thereof. While it may blur the understanding of the present invention, the conventional structure or construction will be omitted.

The basic idea of this invention is to use mean channel matrixes for user scheduling and instantaneous channel matrixes for precoding matrix generation. In the following, we will use the multiuser eigenmode transmission (MET) algorithm and full search strategy as an example to explain this idea. Please note that the proposed idea also applies directly to other algorithms and scheduling strategies.

MET Algorithm

Denote by $N_T$ the number of transmit antennas at the BS, $N_R$ the number of receive antennas per user, N the number of active users, $H_n$ the channel matrix for user-n. Define $s_n$, $T_n = G_n \cdot A_n$ and $R_n = C_n \cdot B_n$ as the number of data streams, the transmit (precoding) matrix, and the receive matrix for user-n. The MET algorithm can be divided into three steps:

Step 1: Calculate $B_n$ for n=1~N.
Perform SVD:

$$H_n = U_n \begin{bmatrix} \Sigma_n & 0 \\ 0 & 0 \end{bmatrix} V_n^H = [u_{n,1} \cdots u_{n,N_R}] \begin{bmatrix} \Sigma_n & 0 \\ 0 & 0 \end{bmatrix} V_n^H,$$

then set $B_n = [u_{n,1} \ldots u_{n,s_n}]^H$.

Thus, $H_n$ is changed from a $N_R \times N_T$ matrix into a $s_n \times N_T$ matrix. $B_n$ is used together with $C_n$ (will be described later in Step 3) to construct a diagonal equivalent channel matrix for user-n, so that its different data streams will not interfere with each other.

Step 2: Calculate $G_n$ for n=1~N.
Define $\Gamma_n = B_n \cdot H_n$, and $\tilde{H}_n = [\Gamma_1^T \ldots \Gamma_{n-1}^T \Gamma_{n+1}^T \ldots \Gamma_N^T]^T$.
Perform SVD:

$$\tilde{H}_n = \tilde{U}_n \begin{bmatrix} \tilde{\Sigma}_n & 0 \\ 0 & 0 \end{bmatrix} \begin{bmatrix} (\tilde{V}_n^{(1)})^H \\ (\tilde{V}_n^{(0)})^H \end{bmatrix},$$

then set $G_n = \tilde{V}_n^{(0)}$.

It ensures that the signals from user-n will be transmitted in the null-space of other users' channels, so that the other users will not receive the signals of user-n.

Step 3: Calculate $A_n$ and $C_n$ for n=1~N.
Denote $\check{H}_n = \Gamma_n G_n$.
Perform SVD:

$$\check{H}_n = \check{U}_n \begin{bmatrix} \check{\Sigma}_n & 0 \\ 0 & 0 \end{bmatrix} \begin{bmatrix} (\check{V}_n^{(1)})^H \\ (\check{V}_n^{(0)})^H \end{bmatrix},$$

then set $A_n = \check{V}_n^{(1)}$ and $C_n = \check{U}_n^H$.
Here $$\check{\Sigma}_n = \begin{bmatrix} \gamma_{n,1} & & 0 \\ & \ddots & \\ 0 & & \gamma_{n,s_n} \end{bmatrix} \quad (A)$$

is a $s_n \times s_n$ diagonal matrix with its $s^{th}$ diagonal element $\gamma_{n,s}$ (s=1~$s_n$).

Step 3 is an SVD operation of the equivalent channel $\check{H}_n$, to help constructing a diagonal equivalent channel matrix for user-n.

Thereby, $T_n = G_n \cdot A_n$ and $R_n = C_n \cdot B_n$ (the transmit (precoding) matrix and the receive matrix) for user-n can be obtained.

The above generates the precoding matrix $T_n$. A complete precoding operation also involves the multiplication of data vector with the precoding matrix, as shown later.

After precoding, the received signal for each user-n can be represented as $$y_n = H_n G_n A_n d_n + H_n \sum_{m \neq n} G_m A_m d_m + \eta_n$$

where $d_n$ is the length-$s_n$ data vector for user-n and $\eta_n$ is an i.i.d. additive white Gaussian noise (AWGN) vector with zero mean and variance $\sigma^2$. Multiplying $y_n$ with the receive matrix $R_n$, the received vector is changed to $$\tilde{y}_n \equiv R_n y_n = C_n \check{H}_n A_n d_n + C_n \Gamma_n \sum_{m \neq n} G_m A_m d_m + R_n \eta_n = \check{\Sigma}_n d_n + n_n =$$

$$\begin{bmatrix} \gamma_{n,1} & & 0 \\ & \ddots & \\ 0 & & \gamma_{n,s_n} \end{bmatrix} d_n + n_n$$

where $\check{\Sigma}_n$ is a $s_n \times s_n$ diagonal matrix with its $s^{th}$ diagonal element $\gamma_{n,s}$(s=1~$s_n$), and $n_n$ is still an i.i.d. AWGN vector with zero mean and variance $\sigma^2$.

Full Search Scheduling

Denote by K the number of users in a cell vying for service. The function of the scheduler is to decide which and how many users out of K users will be active, as well as the number of data streams assigned to each active user. Each possibility of the scheduling result, denoted by $\kappa$, can be expressed by three elements: the active user number $N^{(\kappa)}$, the indexes of active users $\{k_n^{(\kappa)}, n=1\sim N^{(\kappa)}\}$ with $1 \leq k_n^{(\kappa)} \leq K$, and the numbers of their data streams $\{s_n^{(\kappa)}, n=1\sim N^{(\kappa)}\}$. With the full search scheduling, the scheduler searches over the set of all possibilities of $\kappa$, denoted by $\mathcal{R}$, and selects an optimized $\hat{\kappa}$ as $$\hat{\kappa} = \underset{\mathcal{K} \in \mathcal{R}}{\operatorname{argmax}} C(\mathcal{K}) = \underset{\mathcal{K} \in \mathcal{R}}{\operatorname{argmax}} \sum_{n=1}^{N^{(\mathcal{K})}} \sum_{s=1}^{s_n^{(\mathcal{K})}} f\left(\frac{\gamma_{n,s}^{(\mathcal{K})}}{\sigma^2}\right) \quad (1)$$

where $C(\kappa)$ is the throughput achievable by $\kappa$; $\gamma_{n,s}^{(\kappa)}$ is the value of $\gamma_{n,s}$ in (A) in Step 3 corresponding to $\kappa$; $\gamma_{n,s}^{(\kappa)}/\sigma^2$ is the signal-to-noise-plus-interference ratio (SINR) for the $s^{th}$ data stream of user-n in $\kappa$, and $f(\bullet)$ is a function representing the relationship between SINR and the throughput. If the theoretical capacity is considered, $f(\bullet)$ is the Shannon capacity formula, otherwise, it depends on the modulation coding schemes (MCSs) used. In the existing scheduling strategies, instantaneous channel matrixes are used for scheduling, so $\gamma_{n,s}^{(\kappa)}$ is calculated following Steps 1-3 by setting $N = N^{(\kappa)}$, $\{s_n\} = \{s_n^{(\kappa)}, n=1\sim N^{(\kappa)}\}$ and $\{H_n\} = \{H_{k_n^{(\kappa)}}, n=1\sim N^{(\kappa)}\}$.

The object of formula (1) is to find an optimized $\hat{\kappa}$ so that the throughput of the system is maximized. In this case, if $f(\bullet)$ is the Shannon capacity formula, then it means to find an optimized $\hat{\kappa}$ so that the capacity of the system is maximized.

Based on the above discussion, the proposed long-term-CSI-aided joint MU-MIMO and scheduling scheme can be described in two phases as follows:

Scheduling phase: In this phase, the scheduler performs multiuser scheduling according to (1), using the mean channel matrixes instead of the instantaneous channel matrixes. In particular, for each $\kappa$, the value of $\gamma_{n,s}^{(\kappa)}$ in (1) is estimated following Steps 1-3 listed above by setting $N = N^{(\kappa)}$, $\{s_n\} = \{s_n^{(\kappa)}, n=1\sim N^{(\kappa)}\}$ and $\{H_n\} = \{\overline{H}_{k_n^{(\kappa)}}, n=1\sim N^{(\kappa)}\}$.

where $\overline{H}_k$ denotes the mean channel matrix of user-k.

Each user calculates its mean channel matrix $\{\overline{H}_k\}$ by averaging over several observations of its physical channel during a period $T_A$. By using the mean channel matrixes instead, we can greatly reduce the feedback overhead in this phase and also the scheduling complexity, since $\{\overline{H}_k\}$ can be updated in a much lower speed than $\{H_k\}$, and the scheduling operation is performed only when $\{\overline{H}_k\}$ is updated.

In detail, FIG. 1 shows the flowchart of the scheduling phase according to the present invention. At step 101, BS informs all user equipments to feed back their mean channel matrixes. At step 102, all user equipments calculate and feed back their mean channel matrixes. At step 103, BS performs the scheduling by using the fed back mean channel matrixes so as to generate the optimized scheduling result $\hat{\kappa}$ which determines the active user equipment number $N^{(\hat{\kappa})}$, the indexes of active user equipments $\{k_n^{(\hat{\kappa})}, n=1\sim N^{(\hat{\kappa})}\}$ with $1 \leq k_n^{(\hat{\kappa})} \leq K$, and the numbers of the active user equipments' data streams $\{s_n^{(\hat{\kappa})}, n=1\sim N^{(\hat{\kappa})}\}$. Then, at step 104, BS goes into the multiuser precoding phase which will be described in detail later.

In addition, the whole scheduling procedure (steps 101-103) is repeated each time interval $T_L$.

Multiuser precoding phase: In this phase, the BS generates precoding matrixes for users selected in $\hat{\kappa}$ following Steps 1-3. Here the instantaneous channel matrixes $\{H_{k_n^{(\hat{\kappa})}}, n=1\sim N^{(\hat{\kappa})}\}$ are still used to insure good performance of multiuser precoding.

Figure 2:
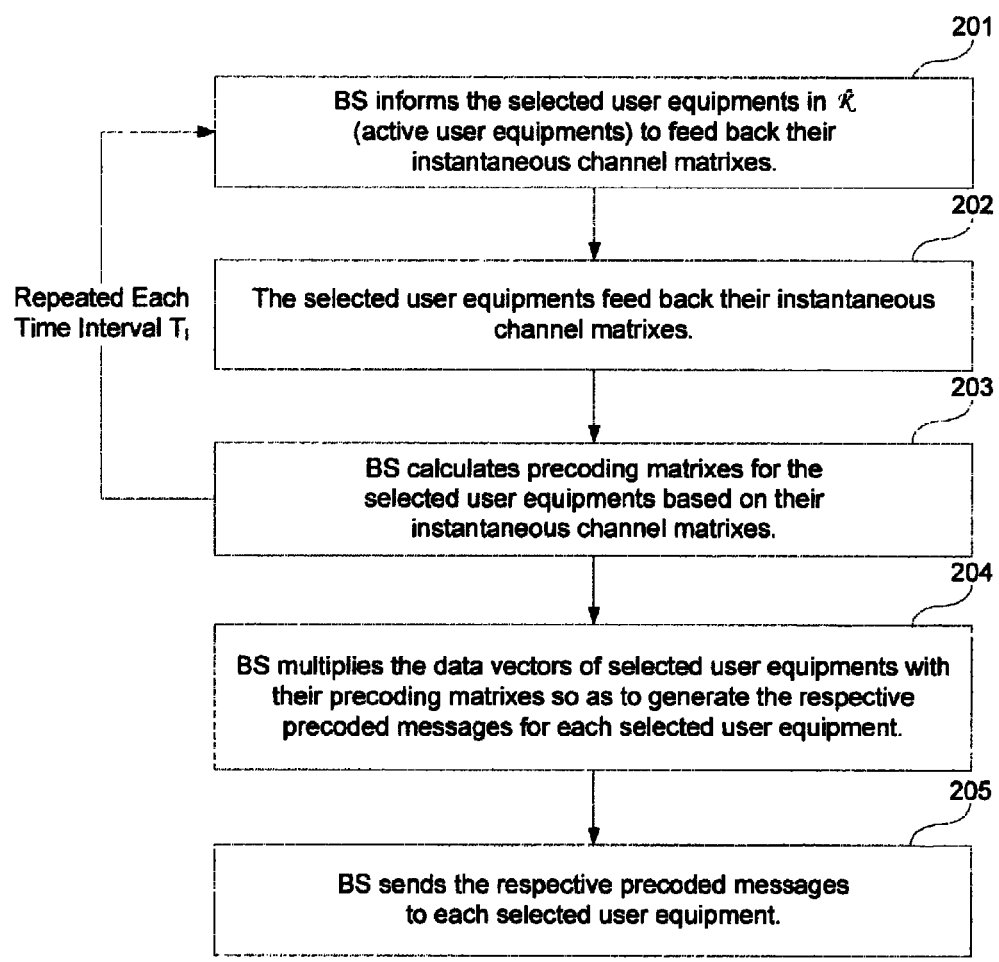
FIG. 2 shows the flowchart of the multiuser precoding phase according to the present invention.

In detail, FIG. 2 shows the flowchart of the multiuser precoding phase according to the present invention. At step 201, BS informs the selected user equipments (active user equipments) to feed back their instantaneous channel matrixes. At step 202, the selected user equipments feed back their instantaneous channel matrixes. At step 203. BS calculates precoding matrixes for the selected user equipments based on their instantaneous channel matrixes.

This multiuser precoding operation (steps 201-203) is repeated each time interval $T_I$. It shall be noted that $T_I$ is much smaller than $T_L$ defined above, since the instantaneous channel matrix changes much faster than the mean channel matrix, so it has to be updated more frequently. It shall be also noted that during the whole operation, the users should keep measuring their physical channel matrixes each time interval $T_I$, so that they can generate the mean channel matrixes for the time duration $T_L$. Preferably, for simplifying the calculation of the mean channel matrixes, the time interval $T_L$ is an integral multiple of the time intervals $T_I$.

At step 204. BS multiplies the data vectors of selected user equipments with their precoding matrixes so as to generate the respective precoded messages for each selected user equipment. Finally, at step 205. BS sends the respective precoded messages to each selected user equipment.

Figure 3:
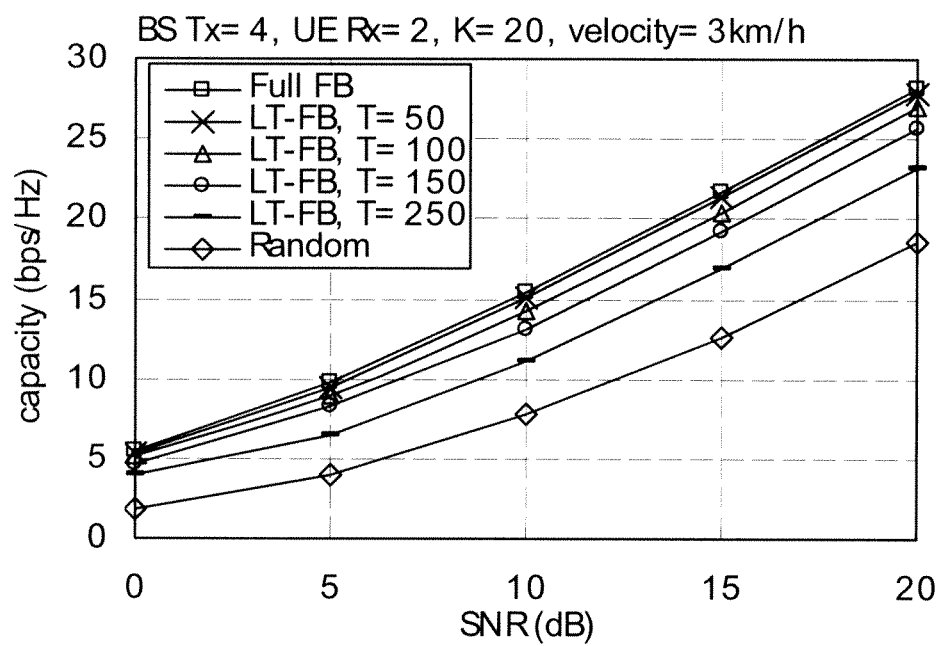
FIG. 3 shows the comparison results between the inventive long-term-CSI-aided scheme with the existing instantaneous-CSI-aided scheme based on the MET algorithm and the greedy scheduling strategy.

In FIG. 3, we compare the proposed long-term-CSI-aided scheme with the existing instantaneous-CSI-aided scheme based on the MET algorithm and the greedy scheduling strategy. The performance of the MET algorithm with random scheduling strategy is also included for reference, in which $N_T$ active users are selected randomly from K users for each transmission. In this simulation, we employ 4 transmit antennas at the base station, two receive antennas per user, and a total user number of 20. The Jacks Model is used to generate frequency-flat time-selective channels for all users with parameters: carrier frequency=2.5 GHz, velocity=3 km/h and sampling frequency=11.2 MHz. The mean channel matrix of each user is generated by averaging its instantaneous channel matrixes over T consecutive symbols. The mean channel matrixes are updated once in a T-symbol period, so the feedback overhead of the proposed scheme is reduced to about 1/T that of the instantaneous-CSI-aided scheme. In our simulation, T is set to 50, 100, 150 and 250. From this figure, we can see that when T=50, the proposed scheme can achieve almost the same performance as the instantaneous-CSI-aided scheme with a feedback overhead of about 1/50. Even with a quite large T=250, the proposed scheme can still achieve a considerable gain over the random scheduling scheme.

Figure 4:
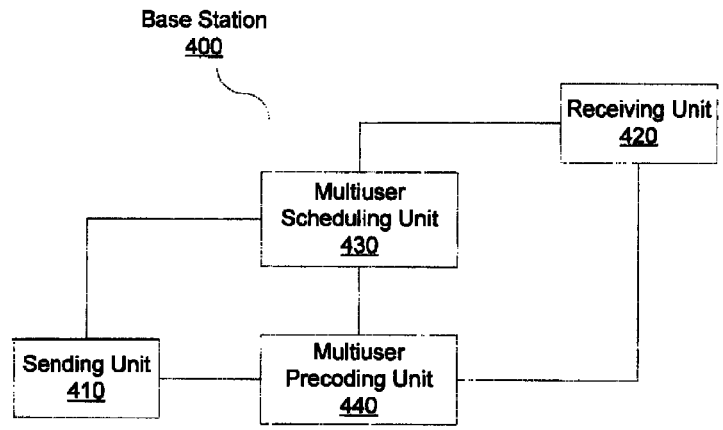
FIG. 4 shows a schematic block diagram of a base station 400 to implement the long-term-CSI-aided MU-MIMO scheduling method according to the present invention.

FIG. 4 shows a schematic block diagram of a base station 400 to implement the long-term-CSI-aided MU-MIMO scheduling method according to the present invention.

As shown in FIG. 4, the base station 400 includes: a sending unit 410 for sending a message to inform user equipments to feed back their mean channel matrixes and/or instantaneous channel matrixes; a receiving unit 420 for receiving the mean channel matrixes and the instantaneous channel matrixes fed back from user equipments; a multiuser scheduling unit 430 for performing multiuser scheduling by using the mean channel matrixes of the respective user equipments; and a multiuser precoding unit 440 for performing multiuser precoding by using the instantaneous channel matrixes of respective user equipments selected by the multiuser scheduling unit 430.

In particularly, the multiuser scheduling unit 430 informs all user equipments to feed back their mean channel matrixes by means of the sending unit 410, receives the mean channel matrixes calculated and fed back by all the user equipments by means of the receiving unit 420, and performs the multiuser scheduling by using the fed back mean channel matrixes so as to generate an optimized scheduling result $\hat{\kappa}$ which determines the active user number $N^{(\hat{\kappa})}$, the indexes of active users $\{k_n^{(\hat{\kappa})}, n=1\sim N^{(\hat{\kappa})}\}$ with $1 \leq k_n^{(\hat{\kappa})} \leq K$, and the numbers of the active users' data streams $\{s_n^{(\hat{\kappa})}, n=1\sim N^{(\hat{\kappa})}\}$.

The sending unit 410 is also used for sending precoded data to the user equipments. The multiuser precoding unit 440 informs all active user equipments selected by the multiuser scheduling unit 430 to feed back their instantaneous channel matrixes by means of the sending unit 410, receives the instantaneous channel matrixes had back by all the active user equipments by means of the receiving unit 420, calculates precoding matrixes for the respective active user equipments based on their instantaneous channel matrixes, multiplies data vectors of the respective active user equipments with their respective precoding matrixes to generate the respective precoded messages for each active user equipments; and sends the respective precoded messages to each active user equipments by means of the sending unit 410.

The multiuser precoding unit 440 calculates the multiuser precoding matrixes for active user equipments every time interval $T_I$, and the multiuser scheduling unit 430 performs the multiuser scheduling every time interval $T_L$. The time interval $T_I$ is much smaller than the time interval $T_L$. Preferably, for simplifying the calculation of the mean channel matrixes, the time interval $T_L$ is an integral multiple of the time intervals $T_I$.

Figure 5:
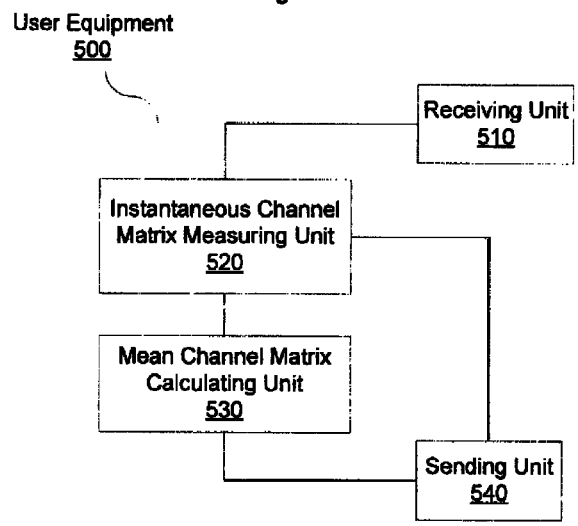
FIG. 5 shows a schematic block diagram of a user equipment 500 to implement the long-term-CSI-aided MU-MIMO scheduling method according to the present invention.

FIG. 5 shows a schematic block diagram of a user equipment 500 to implement the long-term-CSI-aided MU-MIMO scheduling method according to the present invention.

As shown in FIG. 5, the user equipment 500 includes a receiving unit 510, an instantaneous channel matrix measuring unit 520, a mean channel matrix calculating unit 530 and a sending unit 540. In particularly, the receiving unit 510 receives a message requesting to feed back instantaneous channel matrix and/or mean channel matrix from the base station 400. The instantaneous channel matrix measuring unit 520 measures the user equipment 500's instantaneous channel matrix every time interval $T_I$. The mean channel matrix calculating unit 530 calculates the user equipment 500's mean channel matrix every time interval $T_L$ by using the instantaneous channel matrixes measured by the instantaneous channel matrix measuring unit 520 during the immediate time interval $T_L$. The sending unit sends the measured instantaneous channel matrix from the instantaneous channel matrix measuring unit 520 and/or the calculated mean channel matrix from the mean channel matrix calculating unit 530 to the base station 400. The time interval $T_I$ is much smaller than the time interval $T_L$. Preferably, for simplifying the calculation of the mean channel matrixes, the time interval $T_L$ is an integral multiple of the time intervals $T_I$.

The above embodiments are provided for the purpose of example only, and are not intended to limit the present invention. It is to be understood by those skilled in the art that there may be various modifications or replacements to the embodiments without departing from the scope and the spirit of the present invention, and they shall fall into the scope defined by the appended claims.

What is claimed is:

1. A multiuser multi-input multi-output scheduling method, comprising:
    performing multiuser scheduling at a base station by using mean channel matrixes from respective user equipments; and
    performing multiuser precoding at the base station by using instantaneous channel matrixes of respective user equipments selected in the multiuser scheduling;

wherein the multiuser precoding includes:
  informing selected/active user equipments to feed back instantaneous channel matrixes;
  receiving the instantaneous channel matrixes fed back by the selected/active user equipments;
  calculating precoding matrixes for the respective selected/active user equipments based on the corresponding instantaneous channel matrixes;
  multiplying data vectors of the respective selected/active user equipments with the corresponding precoding matrixes to generate respective precoded messages for each selected/active user equipments; and
  sending the respective precoded messages to the corresponding selected/active user equipments.

2. The multiuser multi-input multi-output scheduling method according to claim 1, wherein the multiuser scheduling includes:
  informing user equipments to feed back mean channel matrixes;
  receiving the mean channel matrixes calculated and fed back by the user equipments; and
  performing the multiuser scheduling by using the fed back mean channel matrixes so as to generate an optimized scheduling result.

3. The multiuser multi-input multi-output scheduling method according to claim 2, wherein the optimized scheduling result indicates at least a number of selected/active user equipments, indexes of the selected/active user equipments, and numbers of the selected/active user equipments' data streams.

4. The multiuser multi-input multi-output scheduling method according to claim 2, wherein the optimized scheduling result is generated so as to maximize throughput of a wireless communication system.

5. The multiuser multi-input multi-output scheduling method according to claim 2, wherein the optimized scheduling result is generated so as to maximize capacity of a wireless communication system.

6. The multiuser multi-input multi-output scheduling method according to claim 1, wherein the instantaneous channel matrixes are measured every first time interval $T_I$, and the mean channel matrixes are calculated every second time interval $T_L$ by using the measured instantaneous channel matrixes during the immediate second time interval $T_L$, wherein the first time interval $T_I$ is smaller than the second time interval $T_L$.

7. A base station, comprising:
  a sending unit configured to send a message to inform user equipments to feed back mean channel matrixes and/or instantaneous channel matrixes;
  a receiving unit configured to receive mean channel matrixes and instantaneous channel matrixes fed back from the user equipments;
  a multiuser scheduling unit configured to perform multiuser scheduling by using the mean channel matrixes of the respective user equipments; and
  a multiuser precoding unit configured to perform multiuser precoding by using the instantaneous channel matrixes of respective user equipments selected by the multiuser scheduling unit;
  wherein the sending unit is also configured to send precoded data to the user equipments;
  wherein the multiuser precoding unit is also configured to:
    inform active user equipments selected by the multiuser scheduling unit to feed back instantaneous channel matrixes via the sending unit;
    receive the instantaneous channel matrixes fed back by the active user equipments via the receiving unit;
    calculate precoding matrixes for the respective active user equipments based on the corresponding instantaneous channel matrixes;
    multiply data vectors of the respective active user equipments with the corresponding precoding matrixes to generate respective precoded messages for each active user equipment; and
    send the respective precoded messages to the corresponding active user equipment via the sending unit.

8. The base station according to claim 7, wherein the multiuser scheduling unit is also configured to:
  inform user equipments to feed back mean channel matrixes via the sending unit,
  receive the mean channel matrixes calculated and fed back by the user equipments via the receiving unit, and
  perform the multiuser scheduling by using the fed back mean channel matrixes so as to generate an optimized scheduling result.

9. The base station according to claim 8, wherein the optimized scheduling result indicates at least a number of selected/active user equipments, indexes of the selected/active user equipments, and numbers of the selected/active user equipments' data streams.

10. The base station according to claim 8, wherein the multiuser scheduling unit generates the optimized scheduling result so as to maximize throughput of a wireless communication system in which the base station is located.

11. The base station according to claim 8, wherein the multiuser scheduling unit generates the optimized scheduling result so as to maximize capacity of a wireless communication system in which the base station is located.

12. The base station according to claim 7, wherein the multiuser precoding unit is also configured to calculate the multiuser precoding matrixes for active user equipments every first time interval $T_I$,
  wherein the multiuser scheduling unit is also configured to perform the multiuser scheduling every second time interval $T_L$,
  wherein the first time interval $T_I$ is smaller than the second time interval $T_L$.

13. A user equipment, comprising:
  a receiving unit configured to receive a message requesting to feed back instantaneous channel matrix and/or mean channel matrix from a base station;
  an instantaneous channel matrix measuring unit configured to measure an instantaneous channel matrix every first time interval $T_I$;
  a mean channel matrix calculating unit configured to calculate a mean channel matrix every second time interval $T_L$ by using the instantaneous channel matrixes measured by the instantaneous channel matrix measuring unit during the immediate second time interval $T_L$; and
  a sending unit configured to send the measured instantaneous channel matrix and/or the calculated mean channel matrix to the base station,
  wherein the first time interval $T_I$ is smaller than the second time interval $T_L$.

* * * * *